United States Patent [19]

Cross

[11] 4,153,331

[45] May 8, 1979

[54] FIBER OPTIC INTERFACE JUNCTION ASSEMBLY

[75] Inventor: Michael A. Cross, Severna Park, Md.

[73] Assignee: Westinghouse Electric Corp., Pittsburgh, Pa.

[21] Appl. No.: 800,119

[22] Filed: May 24, 1977

[51] Int. Cl.² ............................................. G02B 5/14
[52] U.S. Cl. .................................................. 350/96.20
[58] Field of Search ................. 350/96.20, 96.21, 96.22

[56] References Cited

U.S. PATENT DOCUMENTS

| 3,871,744 | 3/1975 | Bridger et al. | 350/96.21 |
| 3,946,467 | 3/1976 | Lukas et al. | 350/96.20 |
| 3,947,182 | 3/1976 | McCartney | 350/96.22 |

Primary Examiner—John K. Corbin
Assistant Examiner—Stewart Levy
Attorney, Agent, or Firm—D. F. Straitiff

[57] ABSTRACT

A fiber optic interface junction assembly in which an unsheathed end portion of a floating buffer optical fiber is held in perpendicular biased abutment with an optical interface surface by a constrained terminator for such end portion and a continuous coiled portion of the buffered fiber. The interface surface may be active, as in light transmission to the abutting fiber end, or passive, as in reflection of light backwardly into the fiber at such end, according to the particular function needed to be served by the assembly. The end of the optical fiber abutting the interface surface is made square to the fiber axis by cleaving, for efficient optical coupling with such surface, and chamber means are provided for retention of index matching fluid in encirclement of such end, for added assurance of coupling efficiency and protection against contamination by light-obstructing foreign substances that may be present in the surrounding environment.

7 Claims, 7 Drawing Figures

FIBER OPTIC INTERFACE JUNCTION ASSEMBLY

BACKGROUND OF THE INVENTION

1. Field of the Invention

Fiber optic interface junction assembly.

2. Description of the Prior Art

In working with optical systems that use single fiber waveguides, it is frequently necessary to terminate the fiber in optical-coupling proximity to an interface of another optical member or device in the system. Because of the small size and frailty of single fibers, the methods and means needed to accomplish such optical junction need to be special.

Typical examples of devices or members having an interface surface to which a single fiber waveguide may be coupled optically include, for example, solid state detector or emitter windows, total or partially reflective mirrors, etc.

In one case, for example, a relatively high level of optical power is coupled in and out of one end of a coil of fiber optic waveguide that is terminated at its opposite end by a mirror interface surface to act as a passive optical range simulator device, as disclosed in copending U.S. Patent Application Ser. No. 775,061 filed Mar. 7, 1977 and assigned to the assignee of the present application. Coupling efficiency between the end of the waveguide fiber and the mirror interface surface is adversely affected by any separation distance. Although this source of loss can be virtually eliminated by resort to direct contact of fiber end with the mirror interface, techniques employed in the prior art are not readily adapted to such direct contact, primarily because of a common practice of embedding the fiber ends in rigid termination structures. A rigid termination structure being one in which the fiber end and its mechanical terminator are rigidly attached to one another by means of an epoxy casting that leads to optical polishing of the epoxy-encircled end surface of the optical fiber. Such technique is attended by potential problems which manifest to a greater or lesser degree according to specific circumstances of use. First, it is difficult to ensure that the embedded fiber axis coincides with the axis of the terminator assembly. If the fiber axis is tilted with respect to the terminator axis, polishing produces an end surface of the fiber that is tilted with respect to perpendicularity relative to the fiber axis, and this increases the probability of optical loss. Strain produced during the setting of casting resins can induce permanent microbending loss in the affected section of the fiber, and the absence of strain relief where the fiber enters/leaves the rigid embedment increases the chance of fracture at that stress point. Although the rigid embedment facilitates optical polishing operations, the result is that the fiber end aperture and the embedment surface lie in a common plane which is normally the plane of primary focus of optical energy being coupled into the fiber. If this energy is at a high enough level, there is a strong possibility that spillover energy at the fiber's periphery will burn the embedment material and contaminate the fiber end surface. Further, when a rigidly mounted fiber is brought into contact with a rigidly mounted interface surface, even very small assembly forces result in very high contact pressures (pounds per square inch) due to the small contact area. Damage to the interface surface (mirror, for example) and/or fiber end surface readily occurs, and in situations where the fiber is required to extend unsupported by a small distance beyond the surface of its terminator, there is a tendency for slight misalignments to induce flexure in such unsupported region which, when coupled with compressive forces, results in immediate fracture of the fiber extension. A common practice aimed at overcoming some of these difficulties has been to use shims or other mechanical means to provide controlled separation of the surfaces. Small separations are not easily achieved by such shimming technique, and the separation distance is affected by assembly pressures, material compliances, differential expansion effects, etc., with the result that coupling loss can become significant and unpredictable.

SUMMARY OF THE INVENTION

The present invention overcomes the foregoing difficulties associated with prior art fiber optic assemblies concerned with optical coupling of a fiber end to an interface surface by: direct optical coupling between the fiber end and the interface surface for minimum loss and precise definition of fiber entrance plane location; adjustable controlled contact pressure between the fiber end and the interface surface to maintain full planar contact under dynamic environmental conditions; preparation of fiber end surface by cleaving, for improved optical quality at the interface surface; use of a terminator arrangement at the fiber end that employs flexible embedment to avoid stress concentration points that lead to microbending of the fiber and the optical loss attendant thereto; accommodation of unsupported fiber extensions to afford troublefree operation at higher optical energy densities when needed; accommodation of index matching fluid at the direct interface for minimizing optical loss and avoiding contamination; and, other design and fabrication features aimed at facilitating construction and repair.

As to direct interface between the fiber end and the interface surface, the resultant stabilization in the location of the fiber end leads to reproducible positioning of the fiber entrance with respect to a focal zone, for example, which may exhibit very small dimensions.

The adjustable controlled contact pressure is central to the practical realization of the direct optical interface, and is made possible by virtue of preparation of the fiber end surface by cleaving and by use of a commercially available optical fiber that has a buffer or sheathing encasement that floats free of the fiber itself and has resilient properties, intended to facilitate stripping of such buffer where required.

Fiber end preparation by cleaving, a currently known technique usually involving scribing and fracturing under curvature and tension avoids any need to grip the fiber directly for polishing operations, thus lending itself to rapid preparation of fiber ends whose buffer floats. Cleaved end surfaces can also exhibit good flatness and perpendicularity characteristics with respect to the fiber axis.

DESCRIPTION OF THE PREFERRED EMBODIMENT

Figure 1:
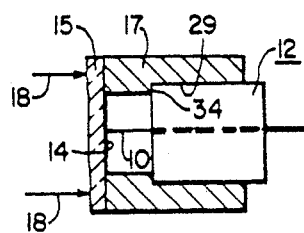
FIG. 1 is a schematic representation of a preferred embodiment of the invention, shown partly in outline and partly in section.

Referring to FIG. 1, the fiber optic interface junction assembly of the present invention comprises an unsheathed end portion 10 of a floating buffer optical fiber 11 held by a terminator 12 in perpendicular abutment with a flat optical interface surface 14 of an optical element 15 under a contact pressure controlled substantially by a coiled section 16 of such floating buffered optical fiber 11 continuing from the terminator 12. The interface surface 14 may be reflective, as in the case where the element 15 may be a mirror, or such surface may be transparent, as in the case where the element 15 is an active component of a system in which light energy is transmitted into the fiber end and the interface surface 14 acts as a window.

Figure 4:
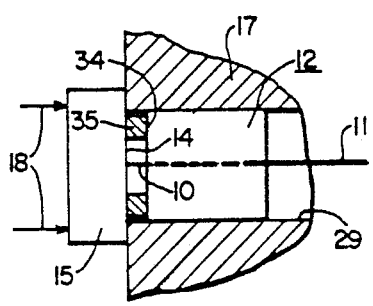
FIG. 4 is a side view, partly in outline and partly in section of an alternate arrangement for the terminator in the assembly of the present invention.

As previously mentioned, the direct interface between the end of the optical fiber 10 itself and the interface surface 14 tends to provide an efficient optical coupling as well as to precisely define the location of the fiber entrance end, inasmuch as the surface 14 is well defined as a result of securement of the element 15 to a housing means 17 as indicated by arrow symbols 18 in FIGS. 1 and 4. Preparation of the end of the unsheathed portion of fiber 10 by cleaving affords opportunity for such unsheathed end to be flat and perpendicular to the axis of such fiber for more complete contact with the interface surface 14, such cleaving being obtained as aforedescribed.

Figure 2:
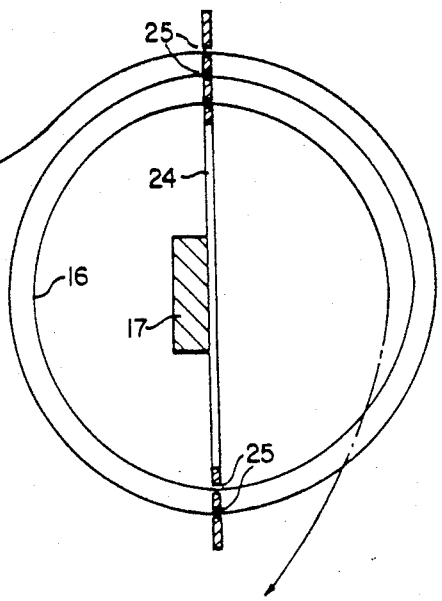
FIG. 2 is a cross-sectional view of a buffered optical fiber employed in the present invention.
Figure 2:
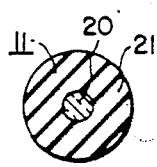

The controlled pressure between the end of the fiber section 10 and the interface surface 14 is made possible by the fact that the floating buffer type of optical fiber tends to permit sliding movement of the fiber 20 itself within the buffer sheath 21, FIG. 2. A step index floating buffer fiber manufactured by Corning Glass Works employs a urethane buffer sheath floating on a silicone oil film interposed between it and the glass fiber. The sheath 21 is resilient and readily bendable. It will be seen that if the floating buffer fiber is short enough and/or straight enough to cause substantially no appreciable friction between fiber 20 and sheath 21, such fiber will be free to slide within such sheath. In accord with a feature of the present invention, however, during assembly the element 15 may be introduced to the housing means 17 in a manner that causes the fiber extension 10 to be pushed into an end of the buffer sheath 21 anchored in the terminator 12 and this is resisted by stretching of a section of the buffer sheath 21 extending beyond such terminator. To control the extent of buffer sheath stretch and hence the fiber end push pressure, a selected number of turns of the floating buffer fiber at selected radii are stored in a slotted coil support member 24 at the exit of the terminator 12 to constitute the aforementioned coil section 16. Coil support member 24 is secured to a portion of the housing means 17 and acts to prevent displacement and dislocation of the coil section 16 as a reaction to the inner sliding movement of the fiber 20 proper upon introduction of the element 15 as aforedescribed. The turns of the coil section 16 introduce a controlled amount of friction between the fiber 20 and the sheath 21 that results in mechanical coupling to efectuate the stretching of such sheath by the inner displacement of the free end 10 of fiber 20 as aforementioned. The requisite friction coupling between inner fiber 20 and outer sheath 21 is particularly enhanced at the locale of slots 25 in support member 24, where such slots locate the several coil turns and may provide a pinching action on fiber sheath. By controlling the amount of initial inward displacement of the unsheathed fiber end as well as the characteristics of the coil section 16, the contact pressure between the fiber end and the interface surface can carefully be selected and controlled. It has been found that a major fraction of the sheath stretch occurs in the relatively straight section between the terminator 12 and the coil section 16, and successively diminishes in succeeding coil sections between the slots 25. In one coil turn, for example, fiber displacements in the range of one-tenth to four-tenths of an inch have been completely absorbed by sheath stretch. The rapid diminishment of sheath stretch in the coil section 16 is the result of the increased friction between the fiber and the sheath in such coil section, due to the curvature. As coil diameter is increased, a larger number of turns are required to obtain a given friction effect, and vice versa. The elastic properties of the stretched buffer sheath are such that reaction bias on the fiber end abutting the interface surface can be made to persist for prolonged periods, after which readadjustment of the assembly may be effectuated if necessary.

For a given displacement of the fiber extension 10, the magnitude of the restoring force is dependent primarily upon the length of the straight section between the terminator 12 and the coil section 16, and secondarily upon the coil diameter. It has been found that with a coil diameter of three inches, straight fiber lengths between seven and 22 inches furnish convenient values of fiber end bias. For a 22-inch straight fiber length and a twelve-hundredth inch displacement the fiber end bias force is typically seven grams, equivalent to a contact force pressure of five hundred sixty grams per square millimeter. The sensitivity to an increase in displacement to two-tenths of an inch increases the fiber end bias force to ten grams. It is seen that for this particular case the contact pressure is not unduly influenced by fiber displacements in the usual range of interest of from one-tenth to two-tenths of an inch, and this characteristic avoids need for close tolerance of the separation distance between the terminator 12 and the interface surface 14. It will be recognized that other bias forces may be more suitable, according to ambient conditions, for example, such as vibration, etc. Contact pressures and fiber displacement of practical interest require only a small degree of buffer stretching on a per-inch basis—ten mils per inch, for example.

It should be recognized that where long lengths of optical fiber may be involved in a particular situation, the entire length of fiber need not be of the floating buffer type, but rather only that required for the junction assembly of the present invention involved in such situation, and could be fabricated to suit particular needs.

Figure 3:
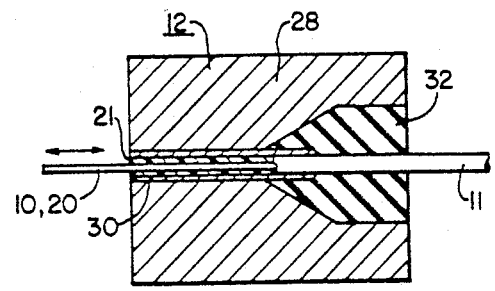
FIG. 3 is a sectional side view of a terminator assembly embodied in the present invention.

Details of a suitable terminator 12 construction are shown in FIG. 3 as including a cylindrical plug 28 to fit in a suitable opening 29 in the housing means 17 for perpendicularity with the interface surface 14 at the terminus of such opening. The plug 28 has a through opening in which is disposed a guide sleeve 30 for accommodation of the sheath of the floating buffer fiber 11. The through opening is enlarged at the fiber input end to accommodate the presence of a resilient material 32 aimed at relieving local stress at the point of entry of the fiber into the terminator. The inner size of the guide sleeve 30 is slightly larger than the outer dimension of the fiber sheath to enable a centering-effect quantity of the resilient material 32 to be vacuum-drawn into the clearance way during terminator assembly. This helps to assure proper perpendicularity-aiming of the unsheathed fiber end toward the interface surface 14 when the terminator 12 is properly disposed in the housing opening 29. A satisfactory embedment material is catalized RTV 511 having a hardness of Shore A-2 durometer forty-five. This material permits of convenient removal, if required.

A residual unsheathed fiber extension section 10 of several tenths of an inch, for example, can help prevent burning of the terminator end by spillover when large energies are being coupled into the fiber. The residual fiber extension is that remaining after the initial fiber extension has been depressed into the sheath to provide the contact bias force. High energies are normally encountered in pulsed laser systems whose optics bring the energy to an intense focus at the fiber entrance aperture—one hundred megawatts per square centimeter can be typical. In most cases the optical design is such that a separation of one- to two-tenths of an inch is sufficient to disperse spillover radiation over a large enough area to prevent burning of the terminator end. Should slight burning of surface contaminants occur, the physical separation will minimize possible transfer to the fiber end. The fiber extension is well supported at the terminator 12 only, but the inherent stiffness of the fiber allows short extensions to exist without significant cantilever deflection. The possibility of such deflection is further reduced by the bias force exerted between the fiber end and the interface surface 14. This in effect braces the unsupported end of the fiber against such surface. A locating shoulder 34 in the housing 17 or on a spacer member 35 affiliated with the housing locates the inner end of the terminator 12 and determines the extend of residual unsheathed fiber length, the length of unsheathed section 10 in the final assembly.

The space between the inner end of the terminator 12 and the interface surface 14 within the housing 17 can serve as a convenient reservoir for disposition of an index matching fluid to which the direct contact zone between fiber end and interface surface is subjected to minimize undesirable energy reflection and optical coupling loss. Antireflection coatings are not readily applied to the end surface of a fiber to achieve a similar result. The controlled environment in the direct contact zone also excludes contaminants of external origin which otherwise can introduce a tendency for burning when deposited on the optical surfaces handling high power levels.

Figure 6:
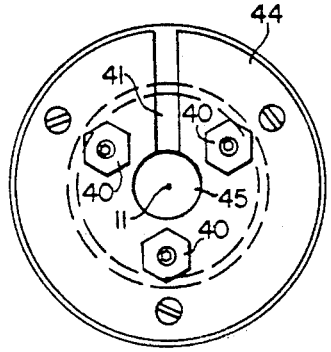
FIGS. 6 and 7 are outline views showing opposite ends of the FIG. 5 construction.
Figure 5:
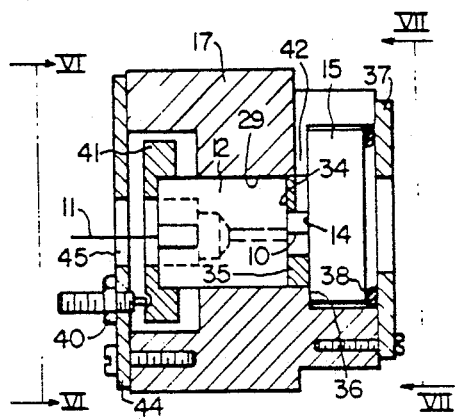
FIG. 5 is a side elevation cross-sectional view of an alternate construction for the optical fiber/interface surface junction portion of the present invention.
Figure 7:
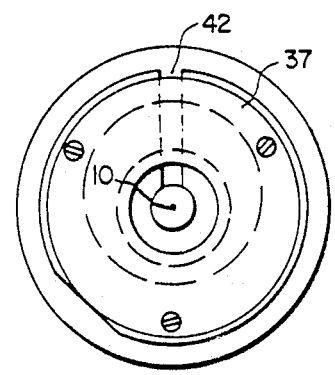

A specific embodiment designed to provide optical coupling between an optical fiber end and the flat interface surface of a partial mirror as the element 15 is shown in FIGS. 5, 6 and 7. This embodiment employs a housing member 17 adapted to hold and locate both the terminator 12 and the element 15. The interface surface 14 of element 15 is located against an annular shoulder 36 formed in the housing member 17. A thin mylar shim, not shown, can be interposed between the two for surface protection and/or position adjustment. The element 15 is retained in place by a removable clamping ring 37 and an O-ring cushion 38 under such clamping ring. The end of the terminator is located relative to the interface surface 14 by the spacer ring 35 interposed between the two. The terminator is lightly biased into contact with the spacer 35 and the spacer in turn similarly biased into contact with the interface surface by a plurality of Vlier spring plunger assemblies 40 and a thrust ring 41 abutting the rear of the terminator. A radial accessway 42 formed in the housing member and the spacer ring 35 provides for introduction of index matching fluid into the cavity within such spacer ring encircling the unsheathed fiber extension portion 10 in contact with the surface 14. The Vlier spring plunger assemblies 40 are disposed on a cover plate 44 removably attached to the housing member 17. Cover plate 44 is provided with a central opening 45 to accommodate through extension of the floating buffer fiber 11 enroute to the coil section 16, and with a radial slot extending outwardly from the central opening 45 to facilitate introduction of the unsheathed fiber end section 10 during insertion of the terminator 12 at initial assembly of junction. The element 15 is located off center with respect to the axis of the terminator and fiber section 10 to permit different surface regions to be presented to the fiber end by the expediency of turning such element. This facilitates overcoming any contamination of the fiber-end-contact area of the interface surface, should this occur, or burning of such area at high energy levels, if that occurs.

By way of additional information, a suitable index matching fluid may be fluorocarbon compound FC104. It is an inert low viscosity index matching fluid that readily penetrates the direct contact zone and withstands high optical power densities. The optimum fluid refractive index is a function of the fiber index and that of the interface surface element or its coating.

Having now described the invention, what is claimed as new and desired to be secured by Letters Patent is:

1. A fiber optic interface junction assembly comprising:
   an optical element having a planar optical interface surface,
   an optical fiber having a straight unsheathed length portion with an end in contact with said interface surface and extending perpendicularly therefrom to an extended portion encased in an elastic sheath in sliding fit with said fiber,
   anchor means for anchoring a forward part of said sheath against movement without preventing slidability of such fiber therein, and
   means for effecting mechanical coupling of said sheath to said fiber a distance from said anchored forward part whereby initial displacement of said unsheathed fiber into said sheath causes longitudinal stretching of said sheath for maintaining a bias force between said unsheathed fiber end and said interface surface.

2. The fiber optic interface junction assembly of claim 1, wherein:
   said anchor means is in form of a terminator assembly that also aims said unsheathed length portion of optical fiber perpendicularly toward said interface surface.

3. The fiber optic interface junction assembly of claim 1, wherein:
   the last recited means includes a coil of selected turns of raddi formed in the extended sheathed portion of said optical fiber.

4. The fiber optic interface junction assembly of claim 1, wherein:
   said unsheathed length portion of said optical fiber is encircled by index matching fluid.

5. The fiber optic interface junction assembly of claim 2, wherein:
   said terminator assembly includes a resilient material in encirclement of the extended sheathed portion of said optical fiber.

6. The fiber optic interface junction assembly of claim 1, wherein:
   said optical element is a mirror and its optical interface surface is optically reflective.

7. The fiber optic interface junction assembly of claim 1, further comprising:
   mounting means for said optical element permissive of adjustment of its interface surface relative to its point of contact with the end of said fiber.

* * * * *